United States Patent Office 3,106,084
Patented Oct. 8, 1963

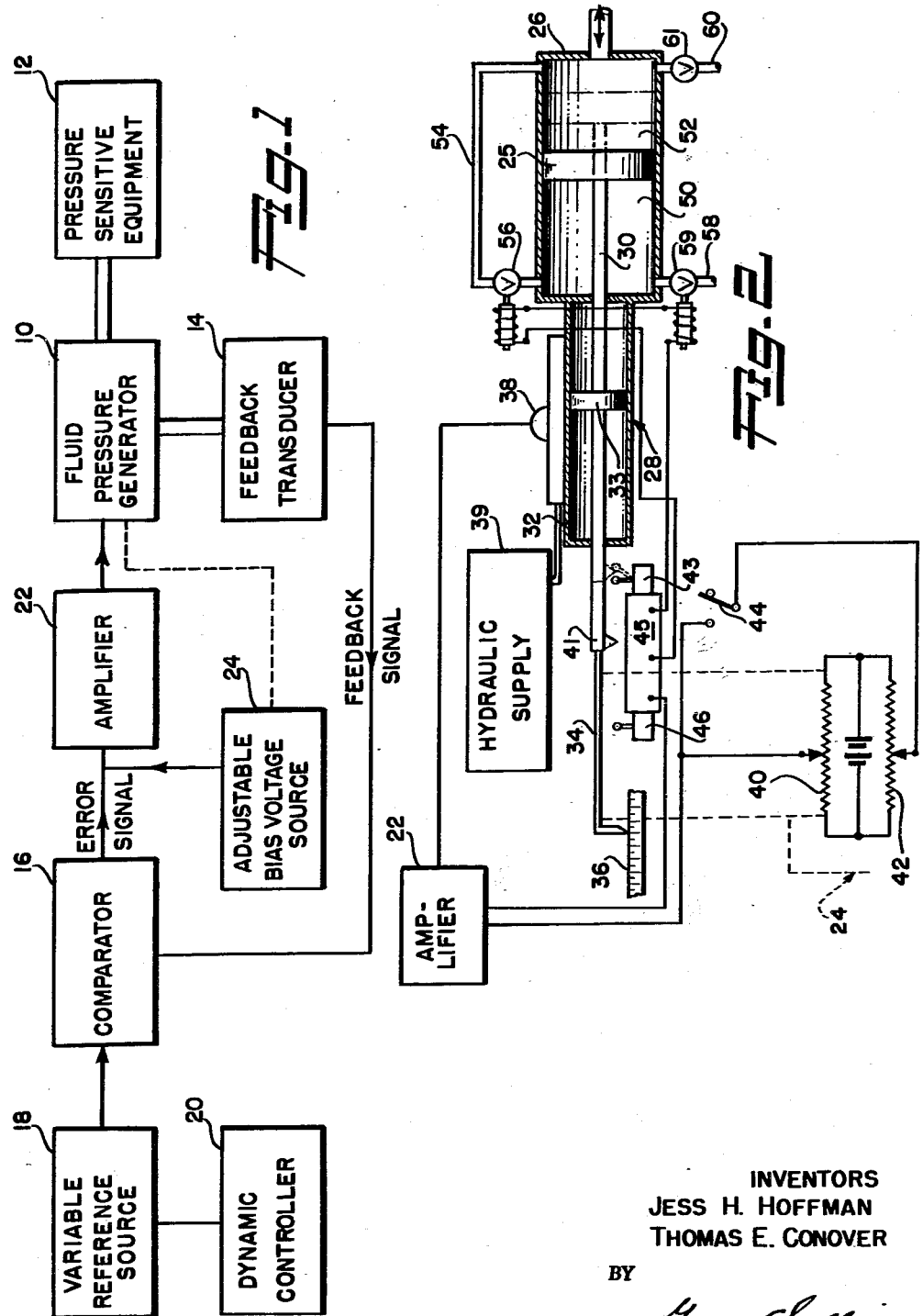

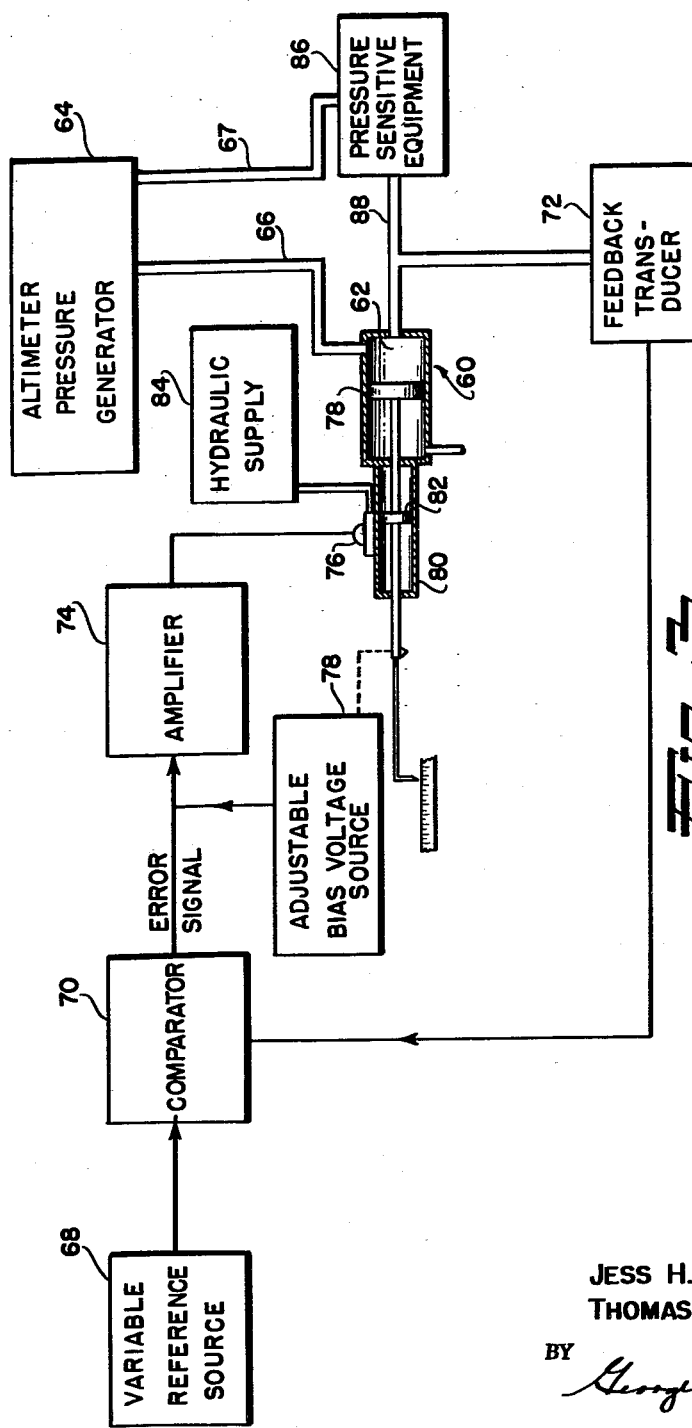

3,106,084
PRESSURE CONTROLLERS
Jess H. Hoffman, North Hollywood, and Thomas E. Conover, Burbank, Calif., assignors to Lockheed Aircraft Corporation, Burbank, Calif.
Filed June 24, 1958, Ser. No. 744,233
4 Claims. (Cl. 73—4)

The present invention relates to pressure controllers and, more particularly, to regulated fluid pressure control systems.

In many instances pressure sensitive measuring equipment, such as altimeters, air speed indicators, Mach meters, and the like, are performance checked only statically using manometer type devices. Since pressure sensitive measuring equipment in general operates dynamically, a check out performance using test equipment of the static type is unrealistic and in many instances unreliable. An altimeter, for example, may appear to be functioning properly when fixed pressures are applied thereto yet produce material errors in outputs when continually varying pressures are applied thereto as in actual use. The ability to check the performance of the device dynamically as it is required to function in actual practice is, therefore, most desirable. Accordingly, it is a primary object of this invention to provide a system for producing absolute pressure variations and having the accuracy for dynamically testing pressure sensitive equipment.

Another object is to provide a system for producing pneumatic pressure variations in a pneumatic chamber wherein the pressure variations are absolute.

A further object of the invention is the provision of a system for producing fluid pressure variations in which a generator is recycled to extend its range of pressures.

Still another object of the present invention is to provide a system for simulating altitude pressure variations by varying the pneumatic pressures in a chamber to produce absolute pressure variation and recycling the same to extend its range over the altitude pressure range of altimeters.

Other objects and features of the invention will become apparent to those skilled in the art as the disclosure is made in the following detailed description of a preferred embodiment of the invention as illustrated in the accompanying drawings in which:

FIGURE 1 is a block diagram of a preferred embodiment of the invention;

FIGURE 2 is a schematic diagram, partially in block diagram, illustrating certain portions of the preferred embodiment of the invention; and FIGURE 3 is a schematic diagram shown partially in block diagram, to illustrate an alternate embodiment of the invention.

Referring now to the drawings wherein like reference characters designate like or corresponding parts throughout the several views, there is shown in FIGURE 1, which illustrates a preferred embodiment, a regulated fluid pressure control system including a fluid pressure generator 10 for producing absolute fluid pressures of extreme accuracy simulating altitude pressure conditions or other pressure variations for testing pressure sensitive equipment such as altimeters or for producing accurate adjustable absolute pressures wherever needed. The output of the fluid pressure generator 10 is shown coupled to the pressure sensitive equipment 12 under test and to a feedback transducer 14 providing absolute pressure sensitive means for measuring the actual performance level of the regulated quantity i.e. fluid pressure. The transducer 14 is capable of measuring the fluid pressure to be regulated and producing a signal which bears a fixed relationship to the pressure, that is, a feedback signal voltage proportional to the level of the regulated fluid pressure. The signal voltage or feedback signal is coupled to a comparator 16 which compares the feedback signal representing the actual performance of the system and a variable reference source 18 representing the desired performance level of the system. The variable reference source 18 is used to preselect performance level of the pressure output of the generator 10. The variable reference 18 may be controlled by a dynamic controller 20 which may preselect the desired variations in the performance level or pressure output of the generator 10.

As a result of the comparison of the feedback signal and the input or reference signal in the comparator 16, the difference or error signal output of the comparator is used to drive an amplifier 22, having an output coupled to the fluid pressure generator 10. The polarity or sense of the error signal is in the direction tending to reduce the error or difference between the feedback and the reference signal. Normally the error is a relatively weak signal which must be raised to a power level needed to control the performance of the fluid pressure generator 10. In the present system, the fluid pressure generator 10 includes apparatus requiring position and null balancing adjustment, therefore the system is shown to include an adjustable biased voltage source 24 producing a signal bias voltage output which is combined with the error signal and amplified to control the fluid pressure generator 10.

In FIGURE 2, the preferred embodiment is shown to include apparatus for the establishment of variation of pressure by the controlled position of a piston in a pneumatic cylinder or chamber 26 where the pressure produced is inversely proportional to the displaced volume caused by the movement of the piston 25. The piston 25 is connected to a hydraulic actuator 28 by a piston rod 30 for the precise movement of the piston 25. The hydraulic actuator 28 is separated from the pneumatic chamber 26 by a common wall having an opening for the connecting rod 30. The hydraulic actuator includes a chamber 32 and a piston 33 inside the chamber which is coupled to the connecting rod 30. An additional rod or the same rod 30 extends on through the end wall through a sealed opening and tapers to form an indicator arm 34 which indicates the position of the actuator and pneumatic pistons on a scale 36. The hydraulic actuator includes an electro-hydraulic valve 38 which is controlled by the signal output of the amplifier 22 and is supplied hydraulic fluid under pressure from a hydraulic supply 39. The valve 38 controls the hydraulic fluid flow and pressure to effect movement of the actuator and pneumatic pistons producing changes in pressures in the pneumatic chamber simulating altitudes in accordance with the variable reference source input.

The circuit arrangements and apparatus included in the adjustable bias voltage source 24 are shown substantially in FIGURE 2. A portion of this apparatus includes the potentiometer 40 having an adjustable tap for coupling in a bias voltage to correct for the inherent drift occurring either electrically or mechanically over finite periods of time. Another potentiometer 42 provides for the positioning of the actuator or hydraulic piston, the position of the tap or wiper arm on the potentiometer 42 controls the direction and rate of movement of the hydraulic piston in the actuator and the pneumatic piston in order to reach a preselected position in the pneumatic chamber 26. A switch 44 provides for manual operation of the positioning control and the sequencer 45 controlled by limit switches 43 and 46 provides for automatic recycling or restroking of the pistons. The potentiometers 40 and 42, preferably, are mechanically coupled (shown here by dashed lines) to the rod 30 or arm 34 to move with the same, e.g. the potentiometer may be in the form of a cursor.

The wipers rest upon the potentiometers 40 and 42 and move with them during the normal movement of the arm 34 from one limit of piston 25 to the other. The wiper of potentiometer 40 taps off a voltage which is supplied directly to amplifier 22. At a null position, this voltage will not cause amplifier 22 to operate the electro-hydraulic valve 38. Deviation one side or the other of the null voltage will function much like the error signal to cause the valve to operate and thus move the actuator 28. Electro-hydraulic valves such as valve 38 inherently drift over a period of time. When the feedback loop from transducer 14 to comparator 16 is open, this drift will cause the piston 33 of hydraulic actuator 28 to move, moving with it the potentiometer 40 fixed to arm 34. By moving the wiper in the appropriate direction and distance relative to potentiometer 40 a sufficiently different voltage will be tapped to amplifier 22 to cause the valve 38 to center and stop the drift of piston 33. Both potentiometers 40 and 42 are so constructed that the distance of relative movement between the wiper and its potentiometer equals the resultant movement of piston 25. Stopping of drift is most easily accomplished by fixing the wiper so that it will not move with the drifting potentiometer 40. It may be temporarily fixed to any stationary structure in relation to which the potentiometer 40 moves. This can be done by manually pressing the wiper against the structure. The potentiometer 40 will move under the wiper arm until a new bias voltage is tapped at which the electro-hydraulic valve 38 will neutralize itself stopping flow to one side or the other of the piston 33, thus stopping its drift.

The potentiometer 42 and its wiper function similarly to potentiometer 40 and its wiper. That is, the wiper moves with the potentiometer 42 with no relative movement during the normal transverse of arm 34. When it is desired to move the piston 25 to a new position, a new voltage may be tapped from potentiometer 42 to cause operation of valve 38 for the necessary movement. This is achieved by closing switch 44 to complete a circuit to amplifier 22, then manually moving the wiper with respect to the potentiometer 42. The wiper is thus moved to the desired new position. The valve 38 will be operated and potentiometer 42 will move with the arm 34 until it arrives at its previous relative position with its wiper arm at which time the previous voltage will be tapped to amplifier 22 and movement will be stopped.

The pneumatic chamber 26 is divided into operating chambers 50 and 52 by the piston 25. The operating chambers are connected by a pneumatic conduit 54 controlled by the valve 56. Each chamber is provided with outlet or inlet conduits 58 and 60 controlled by valves 59 and 61 respectively. In operation, an absolute pneumatic pressure of extreme accuracy is generated and supplied to pressure sensitive equipment by a pneumatic chamber 26 in which the pressure in an operating chamber 52 is applied to the pressure sensitive equipment 12 and feedback transducer 14 and is varied by operation of the pneumatic piston 25 inside the chamber. The movement of the piston 25 to the left, as shown in the diagram, lowers the pressure in the operating chamber 52 simulating an increase in altitude and the pressure continues to decrease as the piston continues to move until it reaches the end of the chamber or its operating stroke.

Pressures higher than atmospheric can be generated by movement of the pneumatic piston to the right, as shown in the diagram, to compress the air in the operating chamber 52. Whenever it is desired to generate pressures higher than surrounding atmospheric, valve 61 is closed during movement of the piston to the right, valve 59 is open and the conduit 58 provides an inlet to the operating chamber 50. Valve 56 is closed to prevent transfer of air or fluids between the operating chambers 50 and 52.

Increased range of operation is provided for the pressure generator 10 or the pneumatic chamber 26 by recycling the piston 25 at the end of its stroke. For example, assuming altitudes are to be simulated above or below those generated when the piston 25 has reached the end of its stroke i.e. the left end of the pneumatic chamber 26 for high altitudes and the right end for higher pressures. Lower pressures, simulating higher altitudes, may be generated by repositioning the piston 25 at the opposite end of the chamber for a new cycle with substantially no change in the pressure in the operating chamber 52 by closing the valve 59 and opening valve 56 while maintaining valve 61 closed. With valve 56 open and valves 59 and 61 closed, the pneumatic piston 25 may be moved and positioned manually by operation of the switch 44 or automatically by operation of limit switches 43 and 46 by the projection on the extended portion of the actuator shaft.

Automatic recycling is provided by operation of limit switches 43 and 46 completing the circuit from the sequencer 45 to the amplifier 22 operating the actuator to move the pneumatic piston 25 to the right. Sequencer 45 provides the proper sequence for operation of valves 56–59 prior pneumatic piston 25. Operation of the limit switch 46 causes sequencer 45 to close valve 59, open valve 56 then cause amplifier 22 to operate valve 38 so that hydraulic actuator 23 will move piston 25. The piston 25 will continue to move to the right during recycling until the limit switch 43 is operated, opening the circuit to the amplifier 22 then closing the valve 56 and opening valve 59.

The operation of the system in generating pressures higher than sea level is similar to that described above except that the operating stroke of the piston is in the opposite direction, that is to the right instead of to the left and the recycling stroke of the piston is to the left. In this mode of operation, providing for increase pressures, valve 59 is normally opened and valve 61 normally closed during the pressure stroke of pneumatic piston 25. During recycling valve 59 is closed, valve 61 remains closed, and valve 56 is opened to provide transfer of pressures between the operating chambers during recycling of the pneumatic piston 25. After recycling, valve 59 is again opened and valve 56 is closed to build up even higher pressures in the operating chamber 52. Whenever increased pressures are being built up, the limit switches 43 and 46 are re-set to recycle as the pneumatic piston is to the extreme right or end of the stroke to operate the piston 25 to the left. Prior to the movement of the piston, the sequencer 45 actuates the valves, opening valve 56 and closing valve 59. At the end of the recycling stroke the limit switch 46 causes sequencer 45 to stop its signal to amplifier 22 to stop the piston and close valve 56 and open valve 59 for a new operating pressure cycle.

In the foregoing description one type of pressure sensitive equipment was referred to, i.e. altimeters, however it is understood that other pressure sensitive equipment including rate of climb meters may be coupled to the fluid pressure generator for testing wherein the dynamic controller varies the rate of change of the variable reference source 18. An additional example would be Mach meters and air speed indicators. The latter meters or indicators have been illustrated in addition to other pressure sensitive equipment in the alternate embodiment of FIGURE 3.

Referring to FIGURE 3, a system has been shown for generating regulated or accurately controlled pressures. As in FIGURE 1, the establishment and variation of pressures is controlled by the position of a pneumatic piston in a cylinder or chamber where the pressure produced is inversely proportional to the displaced volume caused by the movement of the piston. However, in order to simulate speeds at different altitudes for testing Mach meters or air speed indicators which require a static pressure source, the test equipment or system must compensate for different densities of gases or changes in pressures at varying altitudes. In FIGURE 3 therefore a pressure generator 60 including the pneumatic chamber having an operating chamber 62 generates pressures which are compensated for changes in altitude by the altimeter pressure generator 64 which provides the static pressure coupled into the operating chamber 62. The altimeter pressure generator may consist in the pressure generating system shown in FIGURES 1 and 2 where the output pressure of the system is coupled into the operating chamber 62 by the conduit 66 and to the pressure sensitive equipment by the conduit 67.

The regulated system of FIGURE 3 includes a closed loop regulated system compensated for changes in altitude wherein an input signal is derived from a variable reference source 68 which may be calibrated for speeds at different altitudes to produce a speed reference signal varying with altitude and coupled into a comparator 70 for comparison with a feedback signal from a feedback transducer 72. The difference in feedback and reference input signals or error signal is coupled to an amplifier 74 having an output coupled to an electro-hydraulic control valve 76. As in FIGURES 1 and 2, the input to the amplifier 74 includes an adjustable bias voltage for compensating for variations in the valve 76 and for positioning the piston 78 in the pneumatic chamber 60.

The control valve 76 is coupled to the actuating chamber 80 including a piston 82 which is positioned by the fluid from a hydraulic supply 84 coupled into the actuating chamber 80 through the control valve 76. As in FIGURE 1, the amplifier output or the amplified error signal is coupled into the control valve 76 to operate the valve and channel the fluid flow from the hydraulic supply 84 into the actuating chamber on one side or other of the piston 82 depending upon the amplified error signal.

In operation, the pressure sensitive equipment 86 such as Mach meters or air speed indicators are coupled by conduit 88 to the operating chamber 62 of the pneumatic chamber 60 and conduit 67 to pressure sensitive equipment 86. The regulated pressure generating equipment is then operated over the range of the pressure sensitive equipment 86 and checked to determine whether or not the readings on the equipment under test corresponds to the calibrated variable reference source 68. The equipment is also checked for readings at different altitudes in which case it is checked to determine its readings at the altitude settings of the altitude pressure simulator 64 while corresponding to the calibrated variable reference source 68.

The regulated output pressure system of FIGURES 1 and 2 can be made a linear function of the reference input wherein the calibrated reference would be in terms of pressure, however, the output pressure can be made a non-linear function of the input reference signal in accordance with the pressure altitude curve by inclusion of a dynamic controller as shown. The input or variable reference in a system would normally be a linear shaft rotation and may include a loaded potentiometer or a shaped potentiometer, a function board, or any similar device allowing the generation of non-linear altitude pressure signals. It will be noted that the dynamic controller may provide for any type of pressure cycling required.

While certain preferred embodiments of the invention have been specifically disclosed it should be specifically understood that the invention is not limited thereto as many variations will be readily apparent to those skilled in the art and the invention is to be given as broad as possible interpretation within the terms of the following claims.

We claim:
1. In a system for producing fluid pressure variations, pressure generating means comprising a fluid chamber and a piston slidably disposed between two end positions therein to produce absolute pressure variations, means coupled to the piston for operating it including means responsive to its arrival at an end position for recycling the piston to extend its range of pressures.

2. In a system for producing pneumatic pressure variations, pressure generating means comprising a pneumatic chamber and a piston slidably disposed between two end positions therein to produce absolute pressure variations, actuating means coupled to the piston means to provide a control signal, a source of variable reference signals, an adjustable bias signal source, means to apply the control signal, the variable reference signal and the adjustable bias signal to the actuating means and means responsive to its arrival at an end position for recycling the piston to extend its range of pressures.

3. In a system for simulating altitude pressure variations, pneumatic pressure generating means comprising a pneumatic chamber and a piston slidably disposed between two end positions therein to produce absolute pressure variations, means coupled to the piston for operating it including means responsive to its arrival at an end position for recycling the piston to extend its range over the altitude pressure range of altimeters.

4. In a system for simulating pneumatic pressure variations of an air speed indicator at varying altitudes, pneumatic pressure generating means comprising a pneumatic chamber and a piston slidably disposed between two end positions therein to produce absolute pressure variations, means coupled to the piston for operating it including means responsive to its arrival at an end position for recycling the piston to extend its range over the air speed-pressure range of air speed indicators, and altitude compensating means coupled to the pressure generating means for varying the pressures produced as a function of altitude.

References Cited in the file of this patent

UNITED STATES PATENTS

| | | |
|---|---|---|
| 664,805 | Bosworth | Dec. 25, 1900 |
| 1,942,433 | Lindsay | Jan. 9, 1934 |
| 2,246,932 | Collins | June 24, 1941 |
| 2,446,740 | Burns | Aug. 10, 1948 |
| 2,818,726 | Amonette et al. | Jan. 7, 1958 |
| 2,871,830 | Wirth et al. | Feb. 3, 1959 |
| 2,929,391 | Brandstadter et al. | Mar. 22, 1960 |
| 2,955,460 | Stevens et al. | Oct. 11, 1960 |